(12) United States Patent
Suzuki et al.

(10) Patent No.: US 11,215,221 B1
(45) Date of Patent: Jan. 4, 2022

(54) BALL JOINT ASSEMBLY AND METHOD OF ASSEMBLY AND BALL JOINT COMPRESSION RING

(71) Applicant: Musashi Auto Parts Canada Inc., Arthur (CA)

(72) Inventors: Takuya Suzuki, Arthur (CA); Tyler Veld, Arthur (CA)

(73) Assignee: Musashi Auto Parts Canada Inc., Arthur (CA)

( * ) Notice: Subject to any disclaimer, the term of this patent is extended or adjusted under 35 U.S.C. 154(b) by 0 days.

(21) Appl. No.: 17/004,635

(22) Filed: Aug. 27, 2020

(51) Int. Cl.
*F16C 11/06* (2006.01)
*B62D 7/16* (2006.01)

(52) U.S. Cl.
CPC .............. *F16C 11/068* (2013.01); *B62D 7/16* (2013.01); *F16C 11/0633* (2013.01); *F16C 11/0685* (2013.01); *F16C 2226/12* (2013.01); *F16C 2226/52* (2013.01); *F16C 2226/74* (2013.01); *F16C 2326/05* (2013.01)

(58) Field of Classification Search
CPC .............. F16C 11/0619; F16C 11/0623; F16C 11/0633; F16C 11/0638; F16C 11/068; F16C 11/0685; F16C 11/069
See application file for complete search history.

(56) References Cited

U.S. PATENT DOCUMENTS

| | | | | |
|---|---|---|---|---|
| 3,250,556 A | * | 5/1966 | Couch ................ | F16C 11/0609 403/131 |
| 5,782,574 A | * | 7/1998 | Henkel ................... | B62D 7/16 403/135 |
| 6,062,098 A | * | 5/2000 | Spalthoff ............... | B60K 20/02 277/628 |
| 6,773,196 B2 | * | 8/2004 | Broker ................ | F16C 11/0633 403/133 |
| 6,902,344 B2 | * | 6/2005 | Raak .................... | F16C 11/0638 403/133 |
| 7,037,022 B2 | * | 5/2006 | Schonhoff .............. | B60G 7/005 403/114 |
| 7,040,833 B2 | * | 5/2006 | Kondoh .............. | F16C 11/0638 403/135 |

(Continued)

FOREIGN PATENT DOCUMENTS

| | | |
|---|---|---|
| DE | 10110738 | 6/2008 |
| JP | 2000283145 A | 10/2000 |

(Continued)

*Primary Examiner* — Jonathan P Masinick
(74) *Attorney, Agent, or Firm* — Own Innovation; James W. Hinton (57) ABSTRACT

A ball joint assembly, a ring for use in a ball joint assembly, a seat for use in a ball joint assembly, and a method of assembly a ball joint are provided. The ball joint assembly includes a ball stud with a spherical portion and a tapered portion, wherein the spherical portion is positioned in a seat. The ring is formed as an annulus shape and includes a ring projection positioned at an outer surface of the ring, the ring for mounting between the seat and a housing of the ball joint assembly to press-fit high load to the seat. The ball joint assembly includes a seat for attaching to the ball stud at the spherical portion and to support the ring with high stress. The seat includes a seat projection comprising a portion of the seat extending beyond an outer surface of the seat towards the housing.

15 Claims, 7 Drawing Sheets

(56) References Cited

U.S. PATENT DOCUMENTS

| | | | |
|---|---|---|---|
| 7,170,285 B2 | 1/2007 | Spratte | |
| 7,188,563 B2 * | 3/2007 | Liebig | F16C 11/0623 92/187 |
| 7,357,590 B2 * | 4/2008 | Hoppner | F16C 11/0633 403/122 |
| 7,357,591 B2 * | 4/2008 | Broker | F16C 11/0614 403/122 |
| 7,841,799 B2 | 11/2010 | Spratte et al. | |
| 8,137,021 B2 * | 3/2012 | Bohne | F16C 11/0638 403/135 |
| 8,770,882 B2 | 7/2014 | Ersoy | |
| 9,518,602 B2 | 12/2016 | Forthaus et al. | |
| 2004/0037621 A1 * | 2/2004 | Suzuki | F16C 11/0633 403/135 |
| 2005/0105961 A1 * | 5/2005 | Kondoh | F16C 11/0633 403/122 |
| 2018/0251953 A1 * | 9/2018 | Dorman | F16C 11/068 |
| 2019/0070920 A1 | 3/2019 | Kuroda | |
| 2019/0390706 A1 * | 12/2019 | Graber | F16C 11/069 |

FOREIGN PATENT DOCUMENTS

| | | | |
|---|---|---|---|
| JP | 2001304239 A | 10/2001 |
| JP | 2002031125 A | 1/2002 |
| JP | 2005315287 A | 11/2005 |

\* cited by examiner

BALL JOINT ASSEMBLY AND METHOD OF ASSEMBLY AND BALL JOINT COMPRESSION RING

TECHNICAL FIELD

The following relates generally to ball joint assemblies, and more particularly to ball joint assemblies for use in an automobile.

INTRODUCTION

In an automobile system, ball joint assembly is connection that is flexible, and allows movement of the two parts of those connection in more than one direction at the same time.

Ball joints play a critical role in the safe operation of an automobile's steering and suspension. If a ball joint fails, the results can be dangerous as the wheel's angle becomes unconstrained, causing loss of control. Because the tire will be at an unintended angle, the vehicle will come to an abrupt halt, damaging the tires. Also, during failure, debris can damage other parts of the vehicle. Ball joints are a component of the front suspension of a car. The front suspension is a complex assembly of links, joints, bushings and bearings that allow your front wheels to move up and down independently and turn left or right together. Ball joints of your front suspension provide pivoting movement between the steering knuckles and control arms to provide a safe, smooth ride and allow you to precisely control your vehicle. Worn ball joints contribute to looseness in the front suspension. If the looseness is severe, the driver may notice steering looseness, steering vibration, or unusual noises but it often causes other problems before it may be noticeable to the driver. For instance, worn ball joints prevent your vehicle from maintaining wheel alignment. This may result in the tires not maintaining optimum contact with the road. This may contribute to excessive tire wear, shortening the life of your expensive tires. If the wear becomes severe, the stud may separate from the housing resulting in immediate loss of control of your vehicle which may put everyone in danger.

Due to a high working load all the time, the ball joint assembly wears down inside the housing during the normal course of operation. Conventional ball joints may have durability issues and/or lower than desirable durability, particularly under high load conditions. Conventional ball joints may have a reduced life span due to durability issues/reduced durability. Such deficiencies can increase costs, whether by repairing or replacing a deficient ball joint, and negatively impact the safety of those operating vehicles.

Further, conventional methods of manufacturing ball joints can include steps, such as thermal refinement steps that produce a reduction in friction, which, if eliminated, can reduce costs and simplify the manufacturing process.

Accordingly, ball joints and methods of assembling ball joints are desired which overcome conventional ball joint assemblies and methods of assembly.

SUMMARY

An object of the present invention is to provide a ball joint assembly for a vehicle and a related manufacturing method.

A ball joint assembly for a vehicle is provided. The ball joint assembly includes a ball stud with a spherical portion and a tapered portion, the ball stud for attaching to a steering linkage to support movement of a wheel, wherein the spherical portion is positioned in a seat. The ball joint assembly further includes a ring formed as an annulus shape, the ring including a ring projection positioned at an outer surface of the ring, the ring for mounting between the seat and a housing of the ball joint assembly to press-fit high load to the seat. The ball joint assembly further includes a seat for attaching to the ball stud at the spherical portion and to support the ring with high stress, wherein the seat includes a seat projection comprising a portion of the seat extending beyond an outer surface of the seat towards the housing. The ball joint assembly further includes a housing positioned as an external layer of the ball joint assembly for attaching to a control arm to sustain loads from the ball stud.

The housing may be attached to the ring without a gap.

The ring may be positioned between the housing and the seat and above the seat projection.

The seat may further include a plurality of vertical lubrication channels. In an embodiment, the seat includes four vertical lubrication channels. The plurality of lubrication channels include first and second vertical lubrication channels.

The plurality of vertical lubrication channels may be positioned above a horizonal seat axis and substantially parallel with a vertical seat axis.

The seat may further include first and second horizonal lubrication channels.

The first horizonal lubrication channel may be positioned under the second horizonal lubrication channel and parallel with a horizonal seat axis.

The seat may have uniform wall thickness to improve the area of the contact surface and the surface stress. The first and second horizontal lubrication channels may be designed or configured to stabilize and reduce friction.

A ring for use in a ball joint assembly is also provided. The ring includes a ring projection positioned at an outer surface of the ring and contacting a portion of a housing of the ball joint assembly for attaching without a gap; a flat surface positioned at a top of the ring for press-fitting a high load to a seat of the ball joint assembly; an inner surface that contacts the seat above a seat projection of the seat, the inner surface for providing a compression interface to adjust a radius center position of the ring; a lower surface comprising a smooth irregular curve that contacts a top surface of the seat projection for compressing the seat projection; and a smooth radial curve facing an outer surface of the seat for providing improved contact with the seat.

The ring may be positioned between the housing and the seat and above the seat projection.

A seat for use in a ball joint assembly is also provided. The seat includes a plastically deformable top portion that deforms to contact a spherical portion of a ball stud of the ball joint assembly and a smooth radial curve of a ring of the ball joint assembly to give improved contact, wherein the plastically deformable top portion is substantially vertical to a horizonal seat axis and positioned above of the seat projection when in a non-deformed state; a seat projection for anti-rotation of the seat in the ball joint assembly and contacting a compression ring of the ball joint assembly under a high load, wherein the seat projection comprises a portion of the seat extending beyond an outer surface of the seat towards a housing of the ball joint assembly; an annular grease application area for receiving grease to seal the space between an outer surface of the spherical portion of the ball stud and an inner surface of the seat; a plurality of vertical lubrication channels for receiving lubricant to reduce friction in the movement of the spherical portion of the ball stud and provide tension-side lubrication; and first and second horizonal lubrication channels for receiving lubricant to provide compression-side.

The plurality of vertical lubrication channels may be positioned above a horizonal seat axis and substantially parallel with a vertical seat axis.

The horizonal seat axis may be aligned with a centerline of a first horizonal lubrication channel.

The seat may further include first and second horizontal lubrication channels substantially parallel to a horizontal seat axis, wherein the second horizonal lubrication channel is positioned under the first horizonal lubrication channel.

The seat may have a uniform wall thickness for improving contact area and equalizing surface stress. The first and second horizonal lubrication channels may be designed or configured to stabilize and reduce friction.

A method of assembling a ball joint is also provided. The method includes seizing a ball stud into a seat to form a seat and ball stud subassembly; pressing the seat and ball stud subassembly into a housing; pressing a deforming ring into the housing, thereby deforming the seat; applying caulking around the housing to secure positioning of the deforming ring; and pressing a ball joint in a boot direct without a thermal treatment by an oven.

Other aspects and features will become apparent, to those ordinarily skilled in the art, upon review of the following description of some exemplary embodiments.

BRIEF DESCRIPTION OF THE DRAWINGS

The drawings included herewith are for illustrating various examples of articles, methods, and apparatuses of the present specification. In the drawings.

DETAILED DESCRIPTION

Various apparatuses or processes will be described below to provide an example of each claimed embodiment. No embodiment described below limits any claimed embodiment and any claimed embodiment may cover processes or apparatuses that differ from those described below. The claimed embodiments are not limited to apparatuses or processes having all of the features of any one apparatus or process described below or to features common to multiple or all of the apparatuses described below.

The present disclosure provides a ball joint assembly and method of manufacturing the ball joint assembly. The ball joint assembly may have improved performance characteristics, such as improved durability and a longer lifespan. The ball joint assembly includes design improvements over conventional ball joint assemblies which may provide structural optimization among components of the ball joint assembly to provide improved performance characteristics, such as high durability under high load conditions (tension load and compression) and increased lifespan The manufacturing method may advantageously eliminate one or more thermal refinement steps needed when manufacturing conventional ball joint assemblies. Such improved manufacturing method is enabled by the design improvements of the ball joint of the present disclosure.

Figure 1:
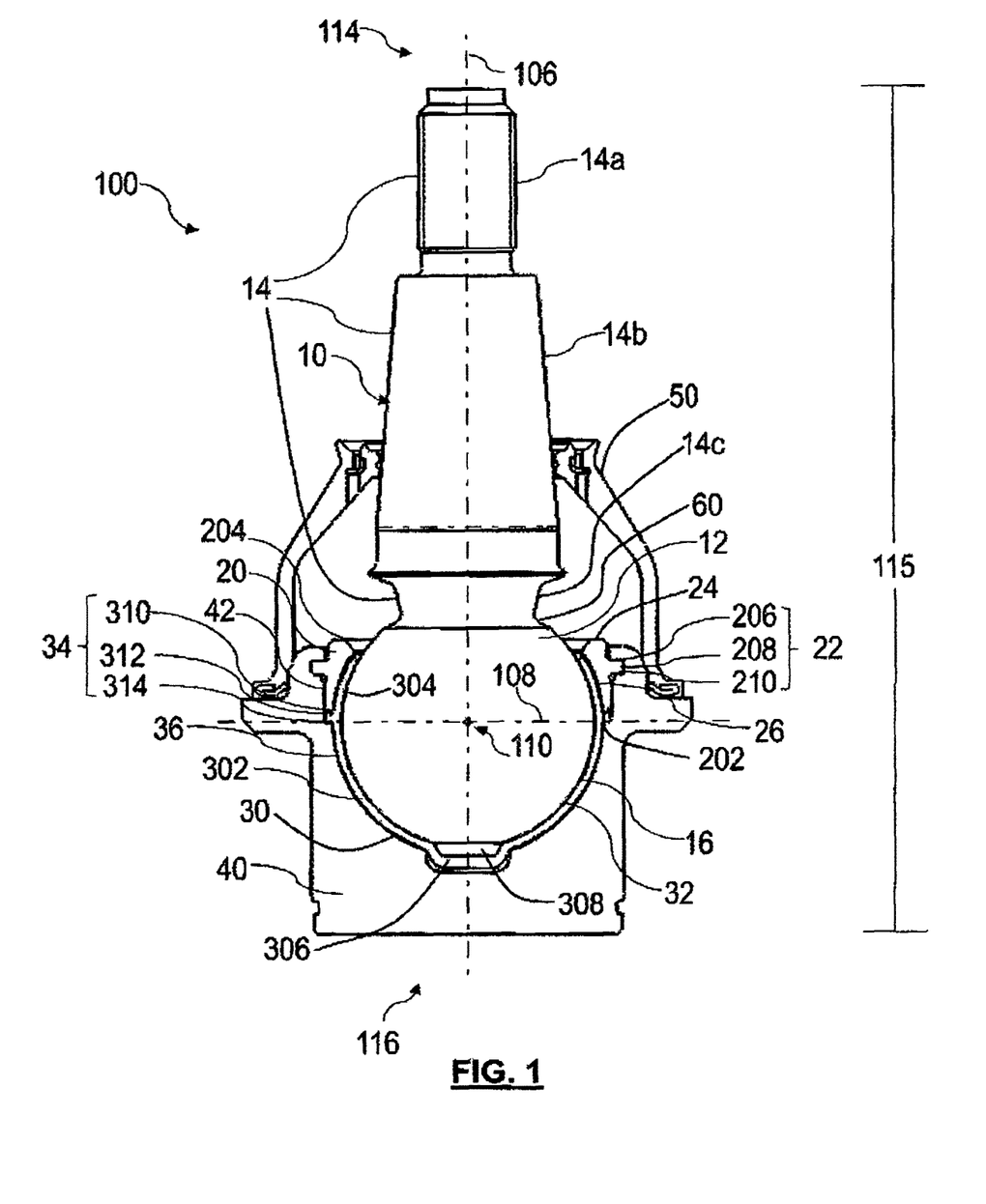
FIG. 1 is a cross-sectional view of a ball joint assembly, according to an embodiment.

Referring now to FIG. 1, illustrated therein is a ball joint assembly 100, according to an embodiment.

The ball joint assembly 100 may be used as an automobile ball joint in an automobile, such as a car or a truck. The ball joint assembly 100 is adapted to equalize stress (e.g. uniform stress distribution) which can increase the longevity of the ball joint, particularly under high durability load conditions.

The ball joint assembly 100 has been used to allow free rotation in two planes at the same time as a component of the front suspension system of a vehicle when the steering wheel is turned to move the vehicle's wheels. Some vehicles have four ball joints, two connecting each front wheel. Such two ball joints with control arms enables motion in all three planes. In addition, the ball joints allow the front end of an automobile to be steered and a spring and shock (damper) suspension to make the ride comfortable and stable as it encounters road bumps.

The ball joint 100 is generally configured to allow free rotation in three planes (i.e. movement in all planes is possible). Two ball joints 100 may be combined with control arms to enable motion in all three planes. This may allow a front end of an automobile to be steered and provide allow a spring and shock suspension for making rides more comfortable, such as when the automobile travels along an uneven surface. On modern automobiles, the ball joint 100 provides a pivot between the wheel and the suspension of the automobile.

In the automobile context, the ball joint 100 may act as a spherical bearing that connects a control arm to a steering knuckle. The ball joint assembly 100 may provide a pivoting movement between the steering knuckles and control arms in an automobile's steering and/or suspension system. In the front suspension design in modern automobiles, the ball joint 100 may connect to an outer end of a lower control arm and a steering knuckle on each side of the automobile. The ball joint 100 may be attached to the control arm by rivets or nuts and bolts or may be pressed into the control arm and held in place with a retainer. The ball joint 100 may be attached (via a ball stud, described below) to the steering knuckle by nuts and bolts.

The ball joint assembly 100 includes a ball stud 10, a ring 20, a seat 30, a housing 40, and a boot 50.

The ball joint assembly 100 has a first end 114 and a second end 116. The first and second ends 114 & 116 are opposed to one another along the length 115 of the ball joint assembly 100.

The ball joint assembly includes a ball stud axis 106 and a housing axis 108. The ball stud axis 106 is defined relative to the ball stud 10. The housing axis 108 is defined relative to the housing 40. The housing axis 108 is perpendicular to the ball stud axis 106 when the ball stud 10 has an oscillation angle of 0 degrees. The ball stud axis 106 is moveable with the ball stud 10, while the housing axis 108 is fixed.

The ball axis 106 and the housing axis 108 intersect at an axes intersection point 110. The axes intersection point 110 may define a ball center of the ball stud 10 (i.e. of spherical portion 12, described below).

The ball joint assembly 100 permits movement of the ball stud 10 including rotation, oscillation, and tension/compression.

In rotation, the ball stud 10 rotates about the ball stud axis 106.

In oscillation, the ball stud 10 oscillates relative to the housing 40 such that the angle formed between the ball stud axis 106 and the housing axis 108 varies off normal. In the present disclosure, the term "oscillation angle" is used to describe the angle between the ball stud axis 106 in a given oscillated position and the ball stud axis 106 in the normal position (the normal position is shown in FIG. 1).

In tension, the ball center of the ball stud 10 moves away from the second end 116 of the ball joint assembly 100 along the ball stud axis 106. In compression, the ball center of the ball stud 10 moves towards the second end 116 of the ball joint assembly 100 along the ball stud axis 106.

The ball stud 10 includes a generally spherical portion 12 (also referred to herein as "ball 12" or "spherical portion 12") and a tapered portion 14 (or stud 14). The spherical portion 12 is positioned in the ball joint assembly 100 proximal to the second end 116. In an embodiment, the semidiameter of the ball 12 may be in the range of 20-40 mm. The tapered portion 14 is positioned in the ball joint assembly 100 proximal to the first end 114. The tapered portion 14 can be used to attach the ball joint assembly 100 to a steering knuckle, such as by threading an end of the tapered portion 14 proximal to the first end 114. The tapered portion 14 includes a first tapered portion 14a, a second tapered portion 14b, and a third tapered portion 14c. The first tapered portion 14a is generally cylindrical in shape and may be threaded to facilitate threaded attachment to a vehicle component (e.g. steering knuckle). The second tapered portion 14b is a truncated cone. In variations, the second tapered portion 14b may have a ⅙ taper or a ⅛ taper. The third tapered portion 14c (or neck 14c) is between the second tapered portion 14b and the spherical portion 12. The third tapered portion 14c may form a straight line between the second tapered portion 14b and the spherical portion 12 (i.e. a straight shaped third tapered portion 14c). The straight shaped third tapered portion 14c may avoid stress concentration. The design may avoid concentration of stresses and breaking of the ball joint 100.

In an embodiment, on the stud 14 where the ball 12 meets the neck 14c of the stud 14, the neck 14 has a taper 60. The taper 60 of the stud 14 where the neck 14c meets the ball 12 is different from some conventional designs which include a flat surface instead of the taper 60 (conventional). The conventional design with a flat surface on the top surface of the ball 12 creates a sharp edge that can damage the seat 30 (e.g. at upper seat portion 304) during oscillation through angle 112 (shown in FIG. 2A). The taper 60 may prevent damage to the seat 30 (e.g. upper seat portion 304) during the oscillation of the stud through angle 112. The taper 60 may also reduce the stress on the seat 30, which may advantageously increase the durability toughness of the ball joint.

Figure 2A:
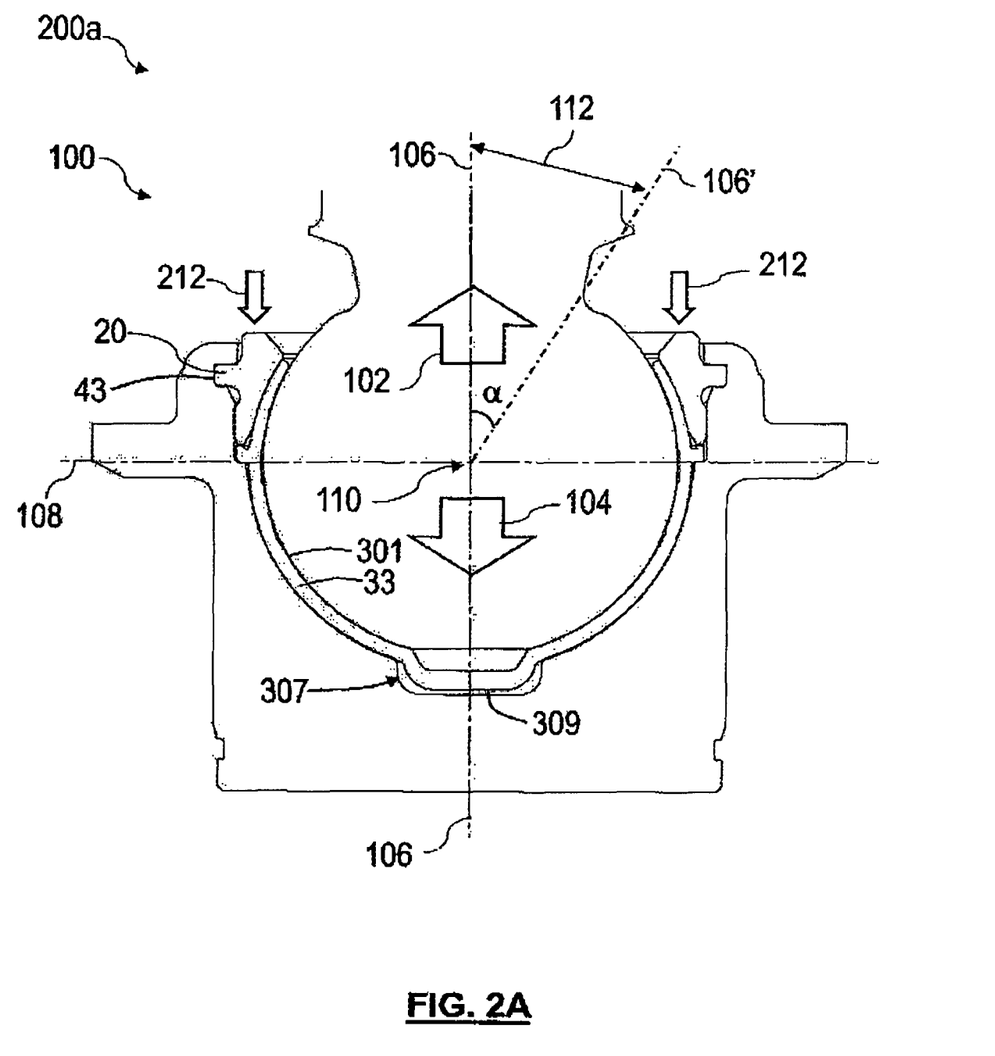
FIG. 2A is a close-up cross-sectional view of the ball joint assembly of FIG. 1.

The seat 30 includes a seat wall 33 and a seat cavity defined by the seat wall 33 (seat wall 33 is shown in FIG. 2A; the seat cavity is not shown in FIG. 1 or 2A as it is occupied by the spherical portion 12 of the ball stud). When assembled in the ball joint assembly 100, the seat wall 33 has a generally curved shaped which conforms or closely matches the shape of the ball 12. In positioning the spherical portion 12 in the seat 30, the seat 30 includes a seat opening at a top end of the seat 30 for receiving the spherical portion 12 therethrough into the seat cavity. When positioned in the seat 30, an outer surface 16 of the ball 12 contacts an inner surface 301 of the seat wall 33 (inner surface 301 is shown in FIG. 2A). The inner surface of the seat wall 33 has a shape that generally matches the shape of the ball 12 such that the ball 12 is received into the seat cavity and mates with the inner surface 301 of the seat wall 33. The ball 12 may be positioned in the seat 30 such that the radial position of the seat 30 is on the ball center. In other words, the seat 30 may have a radius that is close to the radius of the ball 12. This may provide the advantage of avoiding thermal refinement or cooking steps that may be used in the manufacturing of conventional ball joint assemblies. The avoidance of such thermal refinement or cooking is due to the uniform interference of seat 30 and ring 20 (overlapping of seat 30 and ring 20), such as in FIG. 2B. The avoidance of such thermal refinement or cooking is also due to the presence of horizontal and vertical lubrication channels on the seat 30 (such as shown in FIG. 3). The seat 30 having a radius that is close to the radius of the ball 12 may also reduce or prevent overstressing of the seat 30, for example by more efficiently distributing stresses to the ball 12.

The seat wall 33 includes a lower seat wall portion 302, a seat projection 34 (anti-rotation device 34), and an upper seat wall portion 304. The seat wall 33 includes an outer surface 36 (which faces the housing in ball joint assembly 100) and an inner surface 301 (which faces the ball 12 in ball joint assembly 100). The seat projection 34 comprises a protuberance of the outer surface 36 of the seat wall 33 between the upper and lower seat wall portions 304, 302.

Figure 2B:
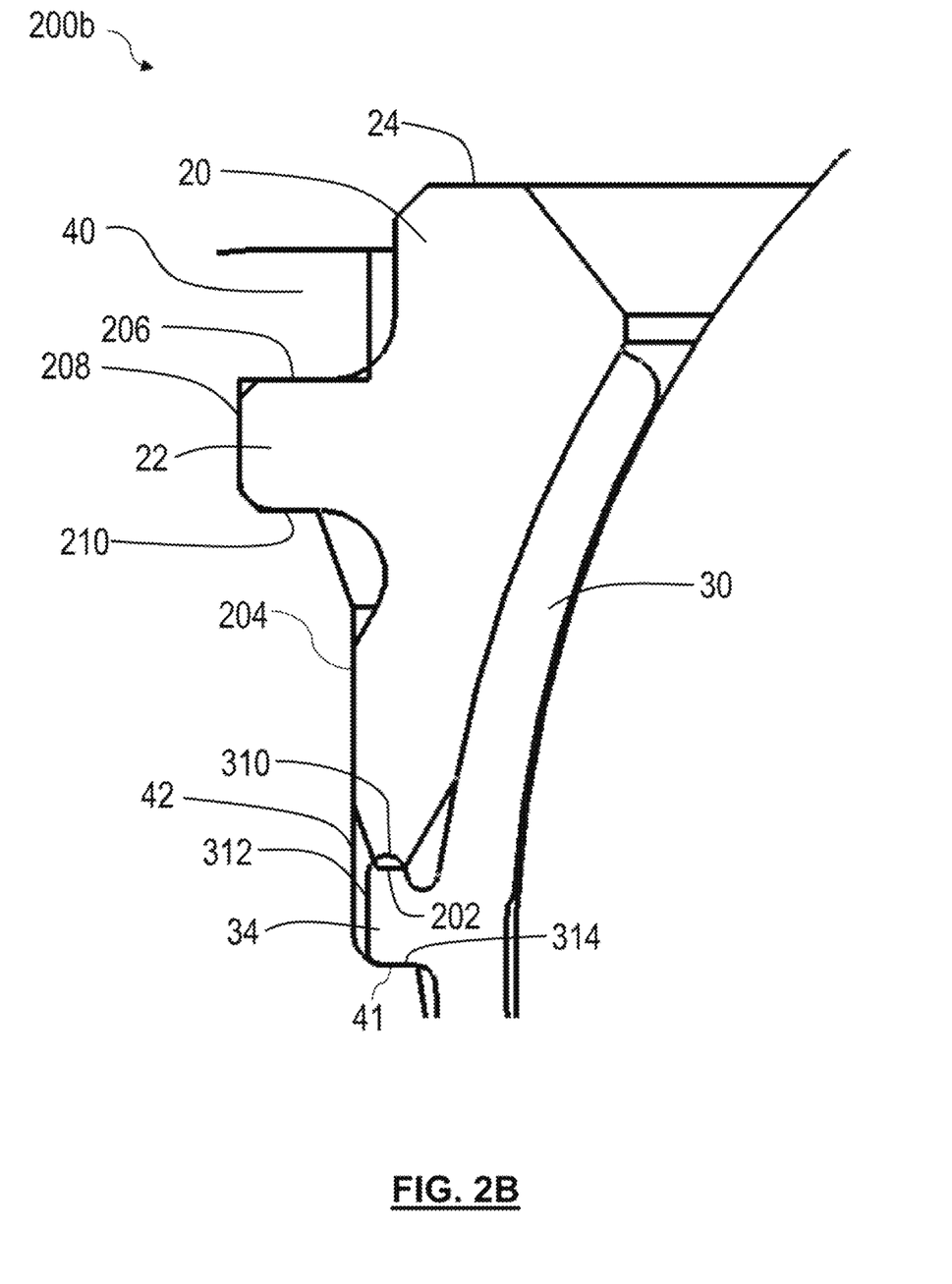
FIG. 2B is a close-up cross-sectional view illustrating interconnection of components of the ball joint assembly of FIG. 1.
Figure 2C:
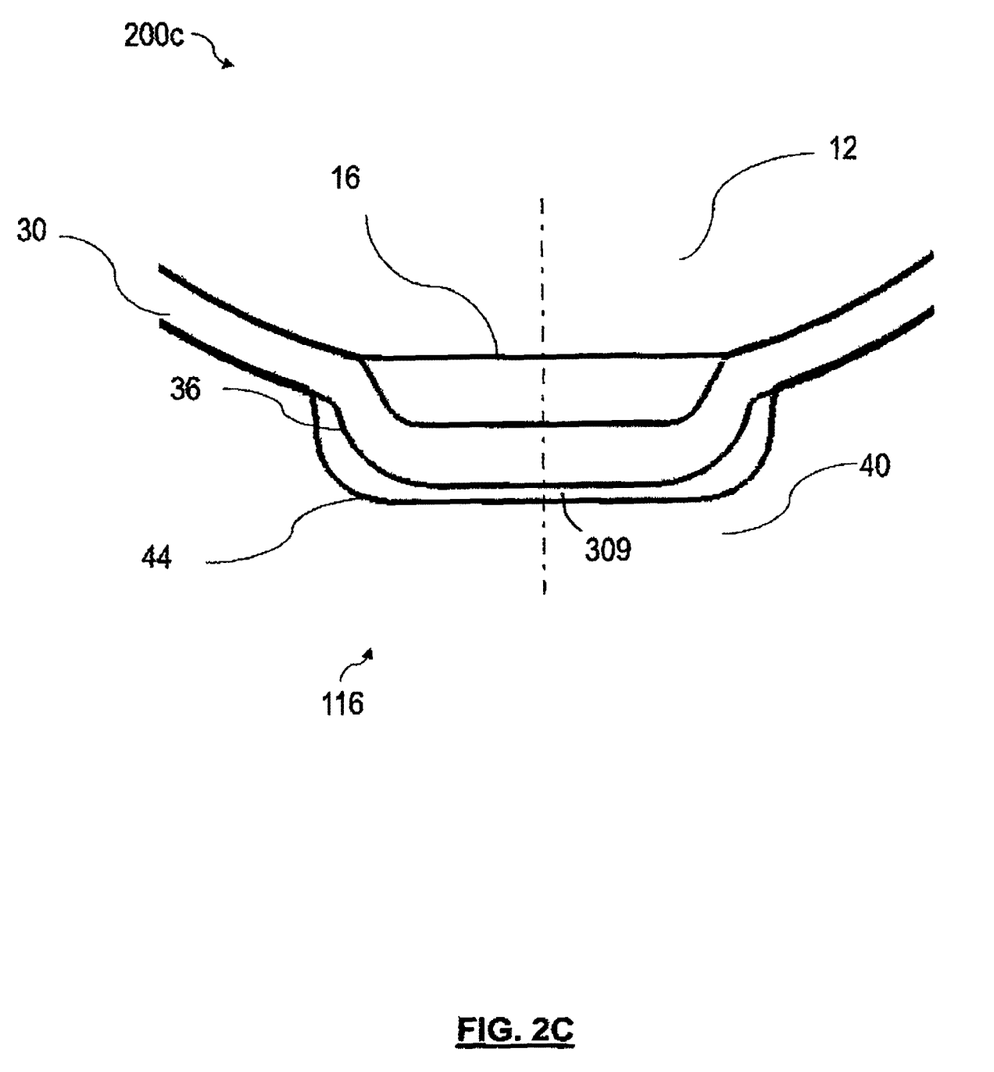
FIG. 2C is close-up cross-sectional view of the ball joint assembly of FIG. 1.

The lower seat wall portion 302 is located below the seat projection 34 and contacts an inner surface of the housing 40. The lower seat wall portion 302 includes a bottom piece 306. The bottom piece 306 provides a grease trap and assembly alignment. The bottom piece 306 projects out from the otherwise curved seat wall 33. The bottom piece 306 is positioned in a seat notch 307 (seat notch 307 is shown in FIG. 2A) of the housing such that there is a gap 309 between an inward facing surface of the seat notch 307 and the outer surface of the seat 30 at the bottom piece 306. Gap 309 is shown in FIGS. 2A and 2C. In FIG. 2C, gap 309 is the area between outer surface 36 of the seat 30 and inner surface 44 of the housing 40. The ball 12 is positioned in the seat 30 such that there is a gap between the bottom of the ball 12 and the inner surface 301 of the seat wall 33 traversing the bottom piece 306. The configuration may allow excess grease to flow to the cavity.

The seat projection 34 is an anti-rotation device that acts as a stopper for anti-rotation of the seat 30 relative to the housing axis 108. The seat projection 34 provides better grip of the seat 30 and prevents rotation of the seat 30. The seat projection 34 is a portion of the seat 30 extending outwards (i.e. towards the housing 40 as shown in FIG. 1) from the seat wall 33. The seat projection 34 has three surfaces including an upper surface 310, a side surface 312, and a lower surface 314. The upper surface 310 faces the ring 20 and contacts the ring 20. The upper surface 310 of the seat projection 34 (anti-rotation device) may be flat, angular, and/or irregular in shape. The side surface 312 of the seat projection 34 is substantially vertical and contacts the housing 40. The lower surface 314 of the seat projection 34 is flat and contacts the housing 40 at the housing ledge 41 (or seat projection ledge 41). The housing ledge 41 is shown in FIG.

2B. In some cases, the seat projection 34 may have any suitable shape that stops rotation of the seat 30.

The upper seat wall portion 304 of the seat wall 33 is located above the seat projection 34 and contacts the ring 20 at an inner surface 26 of the ring 20.

The seat 30 may be manufactured with a straight upper seat wall portion 304. For example, the upper seat wall portion 304 may extend vertically at substantially the same angle as side surface 312 of seat projection 34. The straight upper seat wall portion 304 may then be biased or deformed (e.g. plastically deformed) into a curved shape (matching the curve of the ball 12), which is the position of the upper seat wall portion 304 in FIG. 1, when being assembled in the ball joint assembly 100.

The seat wall 33 has a constant or uniform seat thickness in the lower and upper seat wall portions 302, 304. The uniform seat thickness equalizes surface stresses on the seat 30. By doing so, the seat 30 (and the ball joint 100) may be less likely to develop overstressed portions of the seat 30 (i.e. increased wear in a particular region of the seat 30). The presence of overstressed portions can lead the ball joint 100 to wear out earlier, reducing the lifespan of the ball joint. Accordingly, the uniform seat thickness increases the lifespan of the ball joint 100.

The seat may be comprised of a plastic material.

The housing 40 provides an external layer for the ball joint assembly 100.

The housing 40 includes a generally spherical ball cavity for receiving the seat 30 and the ball 12 (or a portion thereof). The shape of the housing cavity is designed to be slightly larger than the seat radius to reduce friction.

The ball cavity of the housing includes a lower seat notch 307 for receiving the bottom piece 306 of the seat 30. The seat notch 307 may be generally cylindrical in shape. The spherical cavity of the housing 40 terminates at the seat projection ledge 41 which extends outwards from the ball cavity substantially parallel to the housing axis 108. The seat projection ledge 41 continues to a vertical inward-facing wall 42 of the housing 40 running substantially perpendicular to the housing axis 108 (and to the seat projection ledge 41). The vertical inward-facing wall 42 includes a ring notch 43 (ring notch 43 is shown in FIG. 2A). The ring notch 43 is adapted to receive a ring projection 22 of the ring 20.

The ring 20 has a generally annular shape and includes a ring projection 22. Generally, the ring 20 is positioned between the housing 40 and the seat 30 and above the seat projection 34. The ring 20 interfaces with the housing 40 and the seat 30. The ring projection 22 is positioned at an outer surface 204 of the ring 20 (outer surface 204 is shown in FIG. 2B). The outer surface 204 of the ring 20, when positioned in the ball joint assembly 100, is located above the housing axis 108. The outer surface 204 of the ring 20 contacts a top vertical inner surface 42 of the housing 40. The ring projection 22 has three surfaces including an upper surface 206, a vertical side surface 208, and a bottom surface 210 (shown in FIG. 2B). The ring 20 has a flat top (top surface 24). The ring 20 has a smooth radial curve to contact the outer surface 36 of the upper portion 304 of the seat 30. The ring 20 has an inner surface 26 that contacts the seat 30 above the seat projection 34. The lower surface 202 of the ring 20 is designed with a smooth irregular curve that contacts the top surface of the seat projection 34. The shape of the lower surface 202 is adapted to mate with or compliment the shape of the upper surface of the seat projection 310.

The ball joint assembly 100 includes a boot 50. The boot 50 is connected to the second tapered portion 14b at a first boot attachment point and to the housing 40 at a boot press od. The boot press od may be attached to the housing as a small vertical wall and located above the housing axis 108 for fitting moveably. The second tapered portion 14b may include a straight edge segment at the end of the second tapered portion 14b proximal to the third tapered portion 14c. The straight edge segment may be approximately 5 mm. The straight edge segment may be located where the boot 50 is compressed during actual vehicle usage. It should be noted and is to be understood that the boot 50 changes position from a first position (i.e. an assembly or shipping condition) where the boot 50 is positioned at a tapered segment of the second tapered portion 14b to a second position (i.e. a usage position, under load of a vehicle) where the boot 50 compresses to the straight edge segment of the second tapered portion 14b.

The boot 50 may provide a protective encasing for the ball joint assembly 100. The protective casing may prevent dirt and other foreign materials from getting into the joint assembly 100. In some cases, the boot 50 may be a rubber-like boot that allows movement and expansion of lubricant.

The ball joint assembly 100 may have a more uniform stress distribution compared to conventional ball joint assemblies. The increased uniformity of stress distribution of the ball joint system 100 may provide improved performance of the ball joint assembly 100 compared to conventional ball joint assemblies. The uniform stress distribution may help provide the ball joint assembly 100 with high durability under high compression and tension conditions, which may increase the lifetime of the ball joint assembly.

Referring now to FIG. 2A, shown therein is a close-up cross-sectional view 200a of the ball joint assembly 100 of FIG. 1.

View 200a shows the ball axis 106, the housing axis 108, and the axes intersection point 110.

The ball axis 106, and thus the ball stud 10, can move off normal (i.e. oscillate). In view 200a and FIG. 1, the ball stud 10 and ball stud axis 106 are at normal (or perpendicular to the housing axis 108). The ball joint 100 is configured such that the ball stud 10 can oscillate within the seat 30 along oscillation direction 112. View 200a shows an oscillated ball stud axis 106' as an example (note, however, that the ball stud 10 would also oscillate though not shown in FIG. 2A). Reference numeral 106' depicts the ball axis 106 at an oscillated position 106', which may occur as a result of oscillation of the ball stud 10 within the ball joint assembly 100. The angle formed between the ball stud axis 106 and the oscillated ball stud axis 106' represents an oscillating angle α of the ball joint assembly 100. The oscillating angle α permits the ball 12 to oscillate relative to the ball axis 106 up to a certain angle. The oscillating angle α may be large. In an embodiment, the ball joint assembly may have an oscillating angle α of up to 28 degrees. The angle between the ball axis 106 and the oscillated ball axis 106' characterizes the oscillating angle α of the ball joint 100. The oscillation angle of the ball joint 100 may advantageously provide an increased vehicle height and allow for the ball joint 100 to be used in a wider range of vehicle types. The oscillation angle of the ball joint 100 can be altered to fit certain vehicle specifications.

As described, the ball joint assembly 100 is designed such that the ball stud 10 may experience a tension load 102 or a compression load 104. Whether the ball stud 10 experiences the tension load 102 or the compression load 104 may depend on the location of the ball joint assembly 100 in the automobile.

In general, the ball joint 100 may create a tension load 102 when the ball joint 100 is located below the centerline of a wheel in an automobile (also referred to as a "lower ball joint"). The tension load 102 may cause the ball joint 100 to move away from the knuckle.

The tension load 102 is caused by displacement of the ball stud 10 in an upward direction relative to the housing axis 108 away from the second end 116 of the ball joint 100. the tension load 102 moves the ball stud 10 along the ball stud axis 106 away from the second end 116 of the ball joint assembly 100.

In general, the ball joint 100 may create a compression load when the ball joint 100 is located above the centerline of a wheel in an automobile (also referred to as "upper ball joint"). The compression load 104 may force the ball joint 100 and the knuckle together.

The compression load 104 is caused by displacement of the ball stud 10 in a downward direction relative to the housing axis 108 towards the second end 116 of the ball joint assembly 100. The compression load 104 moves the ball stud 10 along the ball stud axis 106 towards the second end 116 of the ball joint assembly 100. In an embodiment, the ball joint 100 may withstand a compression load based on the ball joint sizing. The tension load range of the ball joint 100 may be based on ball joint sizing.

The combination of the tension load 102 and compression load 104 capabilities of the ball joint 100 may provide high durability to the ball joint assembly 100, particularly when compared to conventional ball joint assemblies.

Figure 5:
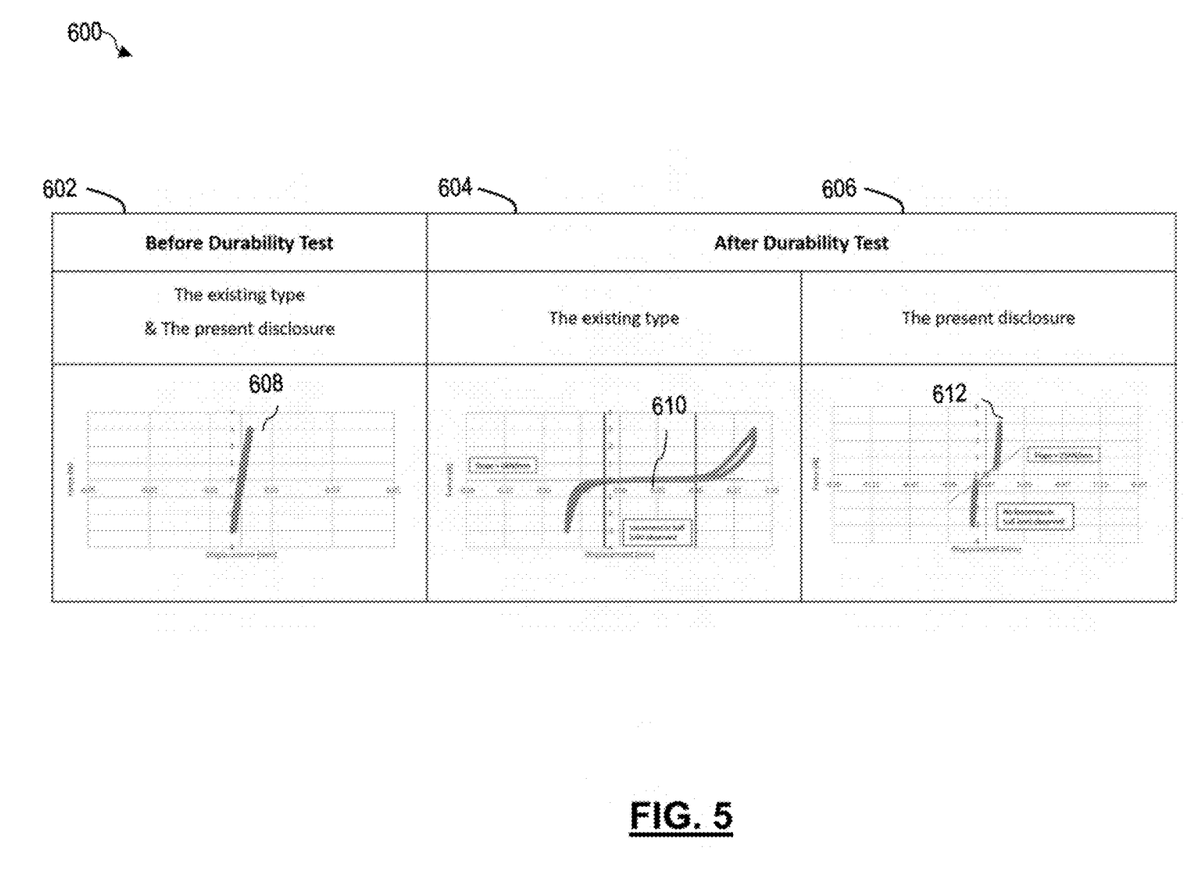
FIG. 5 is a table illustrating a comparison of factors including axial lift and radial lift before and after durability testing for the ball joint of the present disclosure and a conventional ball joint assembly.

The ring 20 is press-fit or interference fit with the seat 30 along press-fit direction 212. The press-fit may be performed with a high load so that there is contact between the ring and housing 210. The press-fitting of the ring 20 in this manner applies high stress to the seat 30. The press-fitting of the ring plastically deforms the seat 30 to match the shape of the ball 12 (e.g. spherical). Applying the surface stress to the seat 30 having a uniform thickness and the same shape as the ball 12 can equalize stress distribution to prolong the lifespan of the ball joint assembly 100. The improved stress performance of the ball joint 100 can be observed in durability testing. Examples of improved performance under durability testing are shown in FIG. 5.

The ring 20 is press-fit or interference-fit with the housing 40. The interference is applied at the ring projection 22 (positioned in the ring notch 43 of the housing 40) to hold the ring 20 in place.

The seat 30 is press-fit or interference-fit with the ring 20. The housing 40 may have an interference adjustment as compared to conventional ball joint assemblies.

The ring 20 has a radius center position and ring radius (defined by inner ring surface 26, described below). The radius center position of the ring 20 and ring radius may be adjusted as compared to conventional ball joint assemblies to reduce friction and improve durability performance.

The ball joint assembly 100 is low friction. This may improve vehicle performance and driver feel, and may improve durability. The low friction provides greater responsiveness feel to driver input.

Referring now to FIG. 2B, shown therein is a close-up view 200b of the interconnection of the ring 20, the seat 30, and the housing 40 of the ball joint assembly 100 of FIG. 1, according to an embodiment.

Generally, the ring 20 is positioned between the housing 40 and the seat 30 and above the seat projection 34.

The ring 20 is formed as an annulus shape with a ring projection 22.

The ring projection 22 is positioned as a projection from the outer surface 204 of the ring 20. The ring projection 22 engages with the ring notch 43 of the housing 40 such that there is clearance between the housing 40 and the ring 20. The outer surface 204 of the ring 20 contacts the top vertical inner surface 42 of the housing 40.

The ring projection 22 includes an upper surface 206, a vertical side surface 208, and a bottom surface 210.

The ring 20 has a flat top surface 24.

The ring 20 has an inner ring surface 26. The inner ring surface 26 defines a ring radius. The ring radius may be defined as the distance from the radius center position of the ring 20 to the inner ring surface 26. The inner surface 26 contacts the outer surface 36 of the seat 30 above the seat projection 34 (i.e. the upper seat wall portion 304). The inner ring surface 26 has a smooth radial curve.

The ring 20 has a bottom ring surface 202. The bottom ring surface 202 is flat. The bottom ring surface 202 contacts and applies pressure to the top surface 310 of the seat projection 34.

The seat projection 34 has a round edge for anti-rotation (avoid rotation of the seat 30).

Referring now to FIG. 2C, shown therein is a close-up view 200c illustrating interconnection of the seat 30, the ball 12, and the housing 40 of the ball joint assembly 100 of FIG. 1, according to an embodiment.

The detailed view 200c of interconnection of components illustrates a portion of the ball joint assembly 100 close to the second end 116. The portion area is symmetrical structure relative to the ball stud axis 106.

A portion of inner surface of the housing 40 contacts a portion of an outer surface 36 of the seat 30 at the bottom 306 of the seat 30. There may be contact between the housing 40 and the outer surface 36 of the seat 30 all the way down to the bottom 306 of the seat 30. Once at the bottom 306, the housing 40 does not contact the outer surface 36 (as space exists at the bottom 306 between the seat 30 and the housing 40).

In a pre-assembled condition or pre-assembled stage, the radius of the housing 40 is larger than the external seat wall radius (i.e. there is a gap that exists between the inner surface of the housing 40 (inner surface of ball cavity facing the seat 30) and the outer surface 36 of the seat 30 in a pre-assembly condition which is closed when pressed into the assembled stage). This may reduce friction between the ball 12 and the seat 30 in the assembled stage.

The seat 30 extends the bottom portion 306 to fill the space of the portion of inner surface 44 of the housing 40.

As shown, there is a gap 308 (e.g. hollow space) between a bottom outer surface 16 of the ball 12 and the bottom piece 306 of the seat 30.

Figure 3A:
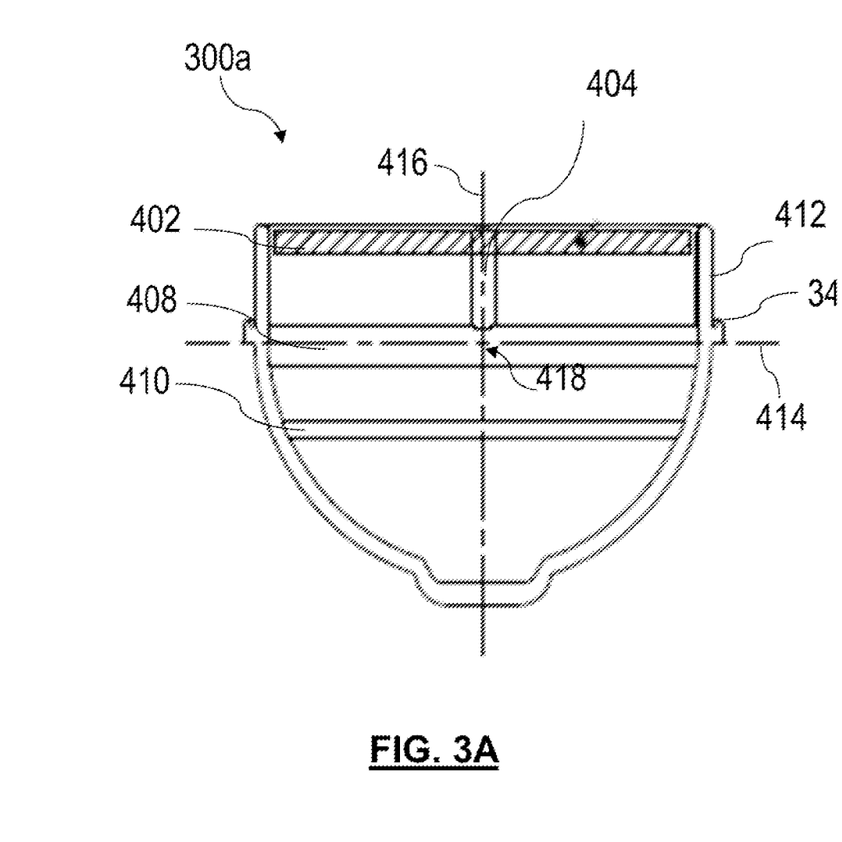
FIGS. 3A and 3B are cross-sectional views of the seat section of the ball joint assembly of FIG. 1, according to an embodiment.
Figure 3B:
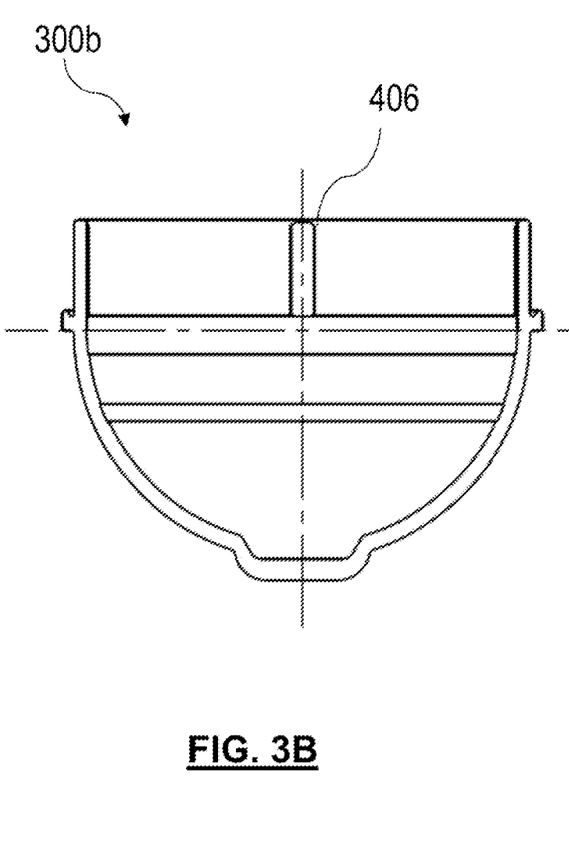

Referring now to FIGS. 3A and 3B, shown therein are cross-sectional views 300a and 300b of the seat 30 of the ball joint assembly 100 of FIG. 1, according to an embodiment. The seat 30 as shown in 300a, 300b is in a pre-deformed state prior to assembly in the ball joint assembly 100.

Generally, the seat 30 may be filled on a top area (applied from 402) of the seat 30 all around with grease or lubricant. The grease may be a low friction grease. The application of the grease to 402 is designed to avoid cracking the seat 30.

The seat 30 includes an annular grease application area 402, a first vertical lubrication channel 404 and a second vertical lubrication channel 406, a first horizontal lubrication channel 408, and a second horizontal lubrication channel 410. In an embodiment, the seat includes four vertical lubrication channels (including first and second vertical lubrication channels 404, 406).

In an embodiment, the seat 30 includes four vertical lubrication channels. The vertical lubrication channels are positioned in the vertical plane.

The annular grease application area 402 is configured to be filled with grease to seal the space between the outer surface 16 of the ball 12 and the inner surface 301 of the seat 30. The annular grease application area 402 traverses the circumference of the seat 30.

As shown in FIG. 3, the seat 30 includes a first seat axis 414 and a second seat axis 416. The horizontal seat axis 414 and the vertical seat axis 416 are generally perpendicular to one another and intersect at an axes-intersection point 418. The axes intersection point 418 corresponds with the ball center of the ball 12 in the ball joint assembly 100.

The second seat axis 416 may be substantially aligned with the ball stud axis 106 when the ball stud 10 has an oscillation angle of 0 degrees (e.g. straight vertical as shown in FIG. 1).

The first seat axis 414 may be substantially aligned with the housing axis 108 or may run substantially parallel to the housing axis 108 when the seat 30 is positioned in the housing 40 of the ball joint assembly 100.

The first and second vertical lubrication channels 404 and 406 are positioned above the horizontal seat axis 414 and parallel with the vertical seat axis 416. The vertical lubrication channels 404, 406 each run from the first (open) end 420 of the seat 30 to first horizontal lubrication channel 408. The first and second vertical lubrication channels 404, 406 provide tension side lubrication. The first and second vertical lubrication channels 404, 406 may avoid seat cracking.

The first and second vertical lubrication channels 404 and 406 are configured to be filled with a lubricant, which may help keep friction low and stable in the movement of the ball 12.

The first horizontal lubrication channel 408 may help keep friction between the ball 12 and the inner surface 301 of the seat 30 low and stable.

The centerline of horizonal lubrication channel 408 is aligned with the horizonal seat axis 414.

The second horizontal lubrication channel 410 is positioned under the horizonal lubrication channel 408 and parallel with the horizonal seat axis 414 and the horizontal lubrication channel 408.

The first and second horizontal lubrication channels 408, 410 are each configured to be filled with lubricant, which may help to apply lubrication and stabilize friction.

The second horizontal lubrication channel 410 provides compression side lubrication.

The first and second horizontal lubrication channels 408, 410 are designed to stabilize and reduce friction.

The seat wall 33 (which includes the upper seat wall portion 304 and the lower seat wall portion 302) has a uniform wall thickness. The uniform wall thickness may improve contact surface and surface stress.

In a non-biased or non-deformed state (such as prior to assembly of the ball joint 100), the upper seat wall portion 304 of the seat 30 is generally perpendicular to the horizontal seat axis 414. This is a pre-assembly configuration of the seat 30. When the seat is assembled in the ball joint assembly 100, the upper seat wall portion 304 is biased or deformed by the ring 20 into a curved shape generally matching the shape of the ball 12 positioned in the seat 30. Such a biased or deformed position is shown in FIGS. 1, 2A, and 2B.

Figure 4:
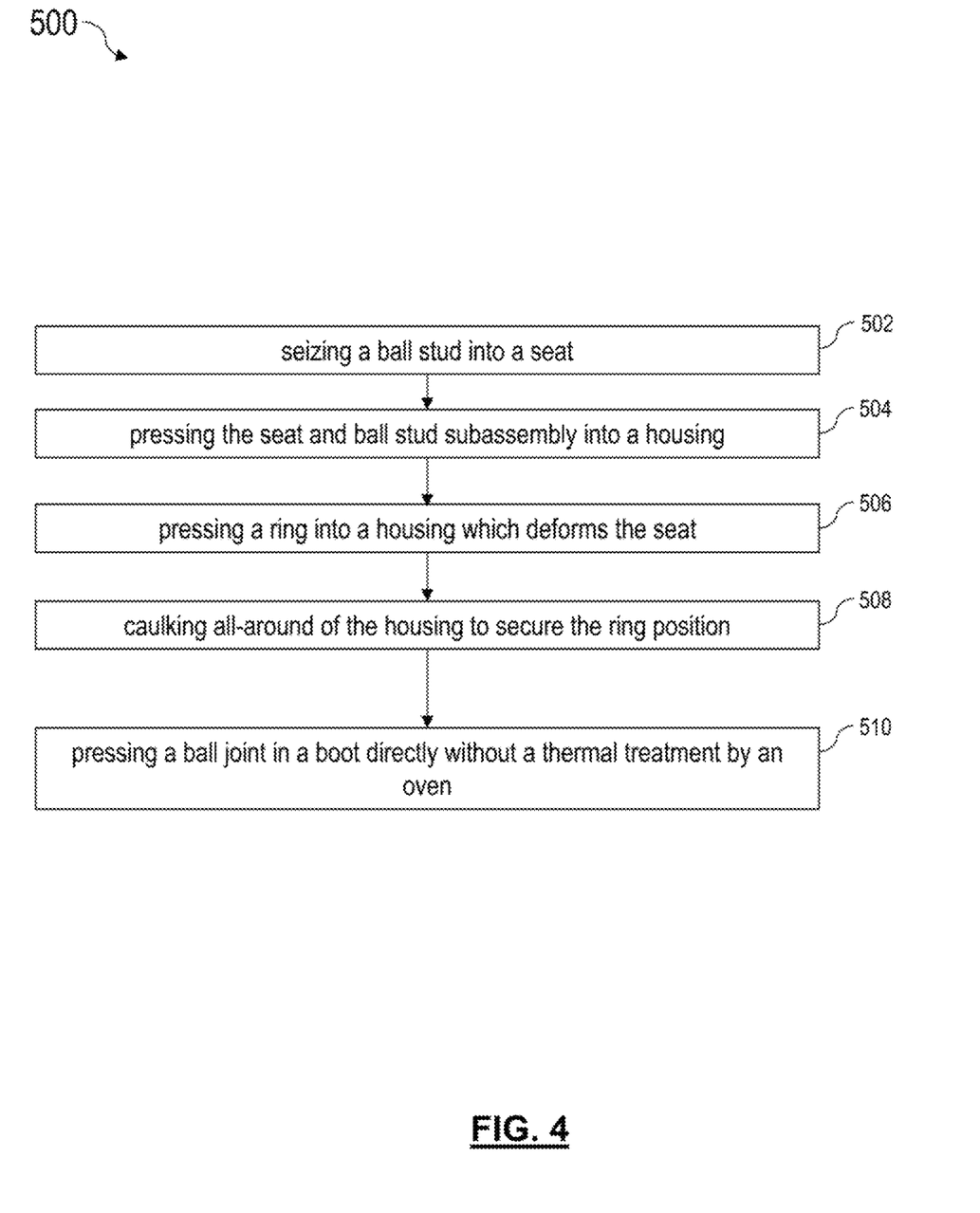
FIG. 4 is a flow chart of a method of manufacturing a ball joint assembly, such as the ball joint assembly of FIG. 1, according to an embodiment.

Referring now to FIG. 4, shown therein is a method 500 of manufacturing a ball joint assembly, according to an embodiment. The method 500 can be used to manufacture a ball joint assembly of the present disclosure (e.g. the ball joint assembly 100 of FIG. 1). The method 500 may have advantages over conventional methods of manufacturing ball joints.

At 502, the ball stud 10 is seized into the seat 30.

At 504, the seat 30 and the ball stud 10 subassembly is pressed into the housing 40.

At 506, the ring 20 is pressed into the housing 40 which deforms the seat 30. The press-fit may be performed with a high load so that there is contact between the ring 20 and the housing 40.

At 508, caulking is applied (e.g. rolled all around) between the housing 40 and the deforming ring 20. The caulking is applied all around the housing 40 to secure the position of the ring 20. This may help avoid the seat cracks and remove air-bleeding at assembly of the ball joint assembly 100. In an embodiment, the caulking is performed such that no air leakage from caulking area is permitted.

At 510, the ball joint is pressed into the boot 50 directly without a thermal treatment, such as by an oven.

Notably and advantageously, the method 500 of manufacturing the ball joint assembly 100 does not require a thermal refinement or cooking step. This advantage is provided by the design of the ball joint assembly 100 described herein and, in particular, by arranging interference (36 and 26 of FIG. 2B) and through application of grease and the design of the grease groove. bringing the radius of the seat 30 and the radius of the ball 12 closer together. This may advantageously reduce costs of manufacture and/or simplify or improve efficiency of the manufacturing process.

The performance characteristics of the ball joint assembly of the present disclosure, such as ball joint 100 of FIG. 1, will now be described with reference to FIG. 5. As described, the ball joint of the present disclosure may provide improved performance characteristics compared to existing or conventional ball joint assemblies. Such improved performance characteristics are enabled by one or more of the design features of the ball joint of the present disclosure, described herein. In some cases, the effects of multiple design features may combine to provide the one or more improved performance characteristics.

As will be demonstrated below with reference to FIG. 5, the ball joint of the present disclosure demonstrated improved durability over a conventional ball joint assembly. Accordingly, the ball joint assembly of the present disclosure may provide improved durability over conventional ball joint assemblies.

Referring now to FIG. 5, shown therein is a table 600 illustrating a comparison of results of durability testing for the ball joint of the present disclosure (e.g. ball joint 100) and a conventional type ball joint assembly. As illustrated, the ball joint assembly of the present disclosure shows a marked improvement in durability testing performance compared to the conventional ball joint type.

The table 600 shows a comparison of factors including axial direction and radial direction before and after a durability test.

The table 600 includes pre-durability test results data 608 in a first column 602 acquired prior to the durability test as a reference. The table 600 also shows durability test data 610 of the conventional type ball joint assembly in a second column 604 and durability test data 612 of the ball joint assembly of the present disclosure in a third column 606 acquired after the durability testing, shown in graph form.

A flat curve in the after-durability test data 610 shows 0 kN/mm of slope, indicating that a looseness in the conventional type ball joint assembly has occurred.

This looseness shown in the test data 610 would lead to early failure of the conventional ball joint. The greater slope of the curve, the less looseness has occurred.

In contrast, the curve slope in the after-durability test data 612 is greater than 25 kN/mm, indicating that the ball joint assembly of the present disclosure remains stiff.

The displacement in the after-durability test data 610 indicates that the seat of the conventional ball joint type has worn more in the tension side than the compression side.

The radial displacement means non-uniform wear has occurred. Greater the radial displacement means greater gap of the non-uniform stress distribution to the entire seat 30.

The displacement data in the after-durability test data 612 is close to the displacement data before durability test. This indicates that the seat 30 of the ball joint assembly 100 has equal amounts of wear in the tension side and the compression side.

While the above description provides examples of one or more apparatus, methods, or systems, it will be appreciated that other apparatus, methods, or systems may be within the scope of the claims as interpreted by one of skill in the art.

The invention claimed is:

1. A ball joint assembly for a vehicle, comprising:
a ball stud with a spherical portion and a tapered portion, the ball stud for attaching to a steering linkage to support movement of a wheel, wherein the spherical portion is positioned in a seat;
a ring formed as an annulus shape, the ring including a ring projection positioned at an outer surface of the ring, the ring for mounting between the seat and a housing of the ball joint assembly to press-fit high load to the seat;
the seat for attaching to the ball stud at the spherical portion and to support the ring with stress, wherein the seat includes a seat projection comprising a portion of the seat extending beyond an outer surface of the seat towards the housing, the seat projection having a flat bottom surface, a flat side surface extending substantially perpendicular to the flat bottom surface, and a bent top surface, the bent top surface extending from a first end at the outer surface of the seat to a second end at the flat side surface, wherein the first end is closer to the flat bottom surface than the second end; and
a housing positioned as an external layer of the ball joint assembly for attaching to a control arm to sustain loads from the ball stud.

2. The ball joint assembly of claim 1, wherein the housing is attached to the ring without a gap.

3. The ball joint assembly of claim 1, wherein the ring is positioned between the housing and the seat and above the seat projection.

4. The ball joint assembly of claim 1, wherein the seat further includes a plurality of vertical lubrication channels.

5. The ball joint assembly of claim 4, wherein the plurality of vertical lubrication channels are positioned above a horizontal seat axis and substantially parallel with a vertical seat axis.

6. The ball joint assembly of claim 1, wherein the seat further includes first and second horizontal lubrication channels.

7. The ball joint assembly of claim 6, wherein the first horizontal lubrication channel is positioned under the second horizontal lubrication channel and parallel with a horizontal seat axis.

8. The ball joint assembly of claim 6, wherein the first and second horizontal lubrication channels are configured to stabilize and reduce friction.

9. A ring for use in a ball joint assembly, the ring comprising:
a ring projection positioned at an outer surface of the ring, the ring projection for contacting a portion of a housing of the ball joint assembly for attaching without a gap when assembled in the ball joint assembly;
a flat surface positioned at a top of the ring for press-fitting a high load to a seat of the ball joint assembly when the ring is assembled in the ball joint assembly;
an inner surface for contacting the seat above a seat projection of the seat when the ring is assembled in the ball joint assembly, the inner surface for providing a compression interface to adjust a radius center position of the ring, the inner surface having a smooth radial curve; and
a lower surface that contacts a bent top surface of the seat projection for compressing the seat projection when the ring is assembled in the ball joint assembly, the lower surface having a shape adapted to mate with or complement the shape of the bent top surface of the seat projection, wherein the bent top surface of the seat projection extends from a first end at an outer surface of the seat to a second end at a flat side surface of the seat projection, and wherein the second end of the bent top surface is closer to the lower surface of the ring than the first end of the bent top surface.

10. The ring of claim 9, wherein the ring is positioned between the housing and the seat and above the seat projection.

11. A seat for use in a ball joint assembly, the seat including:
a plastically deformable top portion that deforms to contact a spherical portion of a ball stud of the ball joint assembly and a smooth radial curve of a ring of the ball joint assembly, wherein the plastically deformable top portion is substantially vertical to a horizontal seat axis and positioned above of a seat projection when in a non-deformed state;
the seat projection for anti-rotation of the seat in the ball joint assembly and contacting a compression ring of the ball joint assembly under a load, wherein the seat projection comprises a portion of the seat extending beyond an outer surface of the seat towards a housing of the ball joint assembly, the seat projection having a flat bottom surface, a flat side surface extending substantially perpendicular to the flat bottom surface, and a bent top surface, the bent top surface extending from a first end at the outer surface of the seat to a second end at the flat side surface, wherein the first end is closer to the flat bottom surface than the second end;
an annular grease application area for receiving grease to seal the space between an outer surface of the spherical portion of the ball stud and an inner surface of the seat;
a plurality of vertical lubrication channels for receiving lubricant to reduce friction in the movement of the spherical portion of the ball stud and provide tension-side lubrication; and
first and second horizontal lubrication channels for receiving lubricant to provide compression-side lubrication.

12. The seat of claim 11, wherein the plurality of vertical lubrication channels are positioned above a horizontal seat axis and substantially parallel with a vertical seat axis.

13. The seat of claim 11, wherein the horizontal seat axis is aligned with a centerline of the first horizontal lubrication channel.

14. The seat of claim 11, further comprising wherein the first and second horizontal lubrication channels are substantially parallel to a horizontal seat axis, and wherein the second horizontal lubrication channel is positioned under the first horizontal lubrication channel.

15. A method of assembling a ball joint, comprising:
- seizing a ball stud into a seat to form a seat and ball stud subassembly, the seat including a seat projection comprising a portion of the seat extending beyond an outer surface of the seat, the seat projection having a flat bottom surface, a flat side surface extending substantially perpendicular to the flat bottom surface, and a bent top surface, the bent top surface extending from a first end at the outer surface of the seat to a second end at the flat side surface, wherein the first end is closer to the flat bottom surface than the second end;
- pressing the seat and ball stud subassembly into a housing;
- pressing a deforming ring into the housing, thereby deforming the seat such that a lower surface of the deforming ring comes into contact with the bent top surface of the seat projection;
- applying caulking around the housing to secure positioning of the deforming ring; and
- pressing a ball joint in a boot direct without a thermal treatment by an oven.

* * * * *